US011157807B2

(12) United States Patent
Abel et al.

(10) Patent No.: US 11,157,807 B2
(45) Date of Patent: Oct. 26, 2021

(54) OPTICAL NEURON

(71) Applicant: International Business Machines Corporation, Armonk, NY (US)

(72) Inventors: Stefan Abel, Zurich (CH); Veeresh V. Deshpande, Zurich (CH); Jean Fompeyrine, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 15/953,438

(22) Filed: Apr. 14, 2018

(65) Prior Publication Data
US 2019/0318234 A1    Oct. 17, 2019

(51) Int. Cl.
| | |
|---|---|
| *G06N 3/067* | (2006.01) |
| *H04B 10/40* | (2013.01) |
| *H04L 5/00* | (2006.01) |
| *G02F 1/355* | (2006.01) |
| *G02F 1/35* | (2006.01) |

(Continued)

(52) U.S. Cl.
CPC .......... *G06N 3/067* (2013.01); *G02F 1/3501* (2013.01); *G02F 1/355* (2013.01); *H04B 10/40* (2013.01); *H04L 5/0048* (2013.01); *G02F 1/3503* (2021.01); *G02F 2203/48* (2013.01); *G02F 2203/50* (2013.01); *G06N 3/04* (2013.01); *G06N 3/08* (2013.01)

(58) Field of Classification Search
CPC .......... G06N 3/067; G06N 3/04; G06N 3/08; G06N 3/0675; H04B 10/40; H04L 5/0048; G02F 1/355; G02F 1/3501; G02F 1/3503; G02F 2203/48; G02F 2203/50; G06E 3/008

USPC .......................................................... 706/40
See application file for complete search history.

(56) References Cited

U.S. PATENT DOCUMENTS

| | | | |
|---|---|---|---|
| 2006/0004681 A1* | 1/2006 | Michel | G06N 3/049 706/26 |
| 2016/0224890 A1 | 8/2016 | Friedman et al. | |
| 2017/0116514 A1* | 4/2017 | Abel | G06N 3/0675 |

(Continued)

FOREIGN PATENT DOCUMENTS

| | | |
|---|---|---|
| WO | 2017046590 A1 | 3/2017 |
| WO | 2017210550 A1 | 12/2017 |

OTHER PUBLICATIONS

Zengguang Cheng et al., "On-Chip Photonic Synapse", Sci. Adv. 3(9), pp. 1-6, XP055596274, retrieved from the Internet: URL:https://advances.sciencemag.org/content/3/9/e1700160.full.pdf, 2017.

(Continued)

*Primary Examiner* — Juan A Torres
(74) *Attorney, Agent, or Firm* — Scully, Scott, Murphy & Presser, P.C.; Daniel P. Morris (57) ABSTRACT

An integrated optical circuit for an optical neural network is provided. The optical circuit is configured to process a plurality of phase-encoded optical input signals and to provide a phase-encoded optical output signal depending on the phase-encoded optical input signals. The phase-encoded optical output signal emulates a neuron functionality with respect to the plurality of phase-encoded optical input signals. Such an embodied optical circuit uses the phase to encode information in the optical domain. A related method and a related design structure are further provided.

18 Claims, 6 Drawing Sheets

(51) Int. Cl.
 G06N 3/04 (2006.01)
 G06N 3/08 (2006.01)

(56) References Cited

U.S. PATENT DOCUMENTS

2017/0351293 A1* 12/2017 Carolan .................. G02F 3/024
2018/0267386 A1*  9/2018 Rios ..................... G02F 1/0126
2019/0294199 A1*  9/2019 Carolan ............... G06N 3/0675
2020/0379504 A1* 12/2020 Carolan .................. G06E 3/005

OTHER PUBLICATIONS

Abel Stefan et al., "Multi-Level Optical Weights in Integrated Circuits", 2017 IEEE International Conference on Rebooting Computing (ICRC), pp. 1-3, XP033273716, 2017.

Shen Yichen et al., "On-Chip Optical Neuromorphic Computing", 2016 Conference on Lasers and Electro-Optics (CLEO), OSA, pp. 1-2, XP033025723, 2016.

Thomas Ferreira De Lima et al., "Progress in Neuromorphic Photonics", Nanophotonics, vol. 6, No. 3, pp. 577-599, XP055596277, 2017.

International Search Report and Written Opinion for PCT/EP2019/057193, 2019.

Response to communication pursuant to Rule 161(1) and 162 EPC submitted in European Application No. 19713747.4-1203 dated Apr. 29, 2021, 14 pages.

* cited by examiner

OPTICAL NEURON

BACKGROUND

Neuromorphic technology relates to computing systems which are inspired by biological architectures of the nervous system. Conventional computing architectures are becoming increasingly inadequate to meet the ever-expanding processing demands placed on modern computer systems. Compared to the human brain, the classical von Neumann computer architecture is highly inefficient in terms of power consumption and space requirements. This has prompted a significant research effort to understand the highly efficient computational paradigm of the human brain and to create artificial cognitive systems with unprecedented computing power.

Neuromorphic networks are widely used in pattern recognition and classification. The parameters (e.g. among them, 'synaptic weights') of the neuromorphic networks may be adaptively trained on a set of patterns during a learning process, following which the neuromorphic network is able to recognize or classify patterns of the same kind.

Neurons and synapses are two basic computational units in the brain.

A neuron can integrate inputs coming from other neurons, in some cases with further inputs, for example from sensory receptors, and generates output signals known as "action potentials" or "spikes", when the integrated input exceeds a threshold value. In the following functions or operations that are performed by a neuron are denoted as neuron functionality.

Synapses change their connection strength because of neuronal activity, and updating the weight of this connection is referred as the training of the network. Synapses typically outnumber neurons by a significant factor (approximately 10,000 in the case of the human brain). A key challenge in neuromorphic computation technology is the development of compact devices that emulate the plasticity of biological synapses. Functions or operations that are performed by a synapse are denoted as synapse functionality.

SUMMARY

According to a first aspect, the invention is embodied as an integrated optical circuit for an optical neural network. The optical circuit is configured to process a plurality of phase-encoded optical input signals and to provide a phase-encoded optical output signal. The phase-encoded optical output signal emulates a neuron functionality with respect to the plurality of phase-encoded optical input signals.

Such an embodied optical circuit uses the phase to encode information in the optical domain.

According to embodiments of the first aspect, the circuit emulates a neuron functionality when producing the phase encoded output signal depending on the sum of phases for the plurality of phase-encoded optical input signals.

This offers advantages in terms of signal restoration. In particular, the phase is decoupled from propagation losses and remains constant. Furthermore, a reduced amplitude of optical mode decays due to propagation losses can be amplified again to restore the signal.

According to an embodiment, the integrated optical circuit is configured to convert the plurality of phase-encoded optical input signals into a plurality of amplitude-encoded signals and to combine the plurality of amplitude-encoded signals into a summation signal. In addition, the integrated optical circuit is configured to perform a non-linear conversion of the summation signal into the phase-encoded output signal. Combining the plurality of amplitude-encoded signals into a summation signal may be performed by an amplitude-integration device, e.g. by a photodetector.

According to such an embodiment, the integrated optical circuit operates in both the phase domain and the amplitude domain. While the input and the output operates in the phase domain, some intermediate processing is performed in the amplitude domain. This facilitates circuit implementations in the amplitude domain.

According to a further embodiment, the integrated optical circuit comprises a reference waveguide configured to carry an optical reference signal and a plurality of input waveguides configured to receive the plurality of phase-encoded optical input signals. Phase differences between the optical reference signal and the optical input signals represent the respective phase-encoded input signal. The integrated optical circuit further comprises an output waveguide and an optical interferometer system. The optical interferometer system is configured to superimpose the plurality of optical input signals and the optical reference signal into a plurality of first interference signals. The optical interferometer system is further configured to superimpose the plurality of first interference signals into a second interference signal. The integrated optical circuit further comprises a phase-shifting device configured to provide the phase-encoded optical output signal in dependence on the second interference signal.

According to such an embodiment, the phase-encoded optical output signal comprises a phase shift relative to the reference signal which depends on the sum of the input states of the optical input signals within a non-vanishing time window. The dependence may be in particular non-linear. The second interference signal corresponds to the summation signal.

With such a summation emulated by means of the interference system and a subsequent non-linear function emulated by the phase-shifting device, a neuron function may be efficiently approximated/emulated in the optical domain.

The reference signal is fed in parallel to the interferometer system and to the phase shifting device. The interferometer system converts the reference signal and the plurality of phase-encoded optical input signals into a second interference signal having an amplitude that depends on the phase shift between the reference signal and the plurality of phase-encoded input signals. The amplitude of the second interference signal is then converted into the phase encoded output signal.

According to a further embodiment, the integrated optical circuit comprises a plurality of first interferometers. Each of the first interferometers is configured to receive the optical reference signal and one of the plurality of optical input signals and to superimpose the optical reference signal and the respective optical input signal into the plurality of first interference signals. A second interferometer is configured to receive the plurality of first interference signals from the plurality of first interferometers and to superimpose the plurality of first interference signals into the second interference signal.

Such a two-stage approach may provide an efficient and reliable implementation of a summation function of the neuron circuit.

According to embodiments, the optical interferometer system comprises one or more single-mode interferometers. Such multi-mode interferometers provide the advantage of power efficiency.

According to embodiments, the optical interferometer system comprises one or more multi-mode interferometers. Such multi-mode interferometers provide the advantage of an easier design.

According to an embodiment, the phase-encoded optical output signal comprises a phase shift within a predefined range relative to the optical reference signal. Preferably the predefined range is a range between 0° and 180°. This ensures an unambiguous coding of the phase encoded output signal.

According to an embodiment, the integrated optical circuit comprises a power normalization unit configured to perform a normalization of an output power of the phase-encoded optical output signal.

Such an embodiment can ensure that the phase-encoded optical output signal has always the same amplitude. Preferably the power normalization unit comprises an amplifier and a saturated absorber. The amplifier drives the power/amplitude of the optical output signal into the saturation region of the saturated absorber and the corresponding saturation level of the saturated absorber defines the normalized output power.

According to an embodiment, the tunable attenuator is implemented as tunable absorber.

According to a further embodiment, the phase-shifting device comprises a non-linear optical material with a non-linear power-to-refractive-index conversion.

Nonlinear optical materials may be defined as materials in which the dielectric polarization P responds nonlinearly to the electric field E of incident light. The nonlinearity depends on the intensity/amplitude of the light. According to embodiments, the nonlinear material may be e.g. BaTiO3, LiNbO3, ferroelectric perovskites, polymers with non-linear optical properties, chalcogenides or III-V compound semiconductors.

According to a further embodiment, the phase shifting device comprises a phase change material. Such a phase change material changes its material state in dependence on the incident optical power. According to a preferred embodiment, materials with metal-insulator transitions may be used. Such materials may be in particular correlated oxides materials, in particular Vanadium Dioxide ($VO_2$). The transition temperature between the insulating phase state and the metallic phase state of $VO_2$ is approximately in a range between 65° C. and 75° C. which makes $VO_2$ a preferred choice. At room temperature, $VO_2$ is still well below the transition temperature and hence in the insulating state. And with some heating as a result of an incident optical power, $VO_2$ can efficiently be brought above the transition temperature, thereby transition it to the metallic state.

According to other embodiments, the phase change material may be $V_4O_7$, $V_6O_{11}$, $V_2O_3$, $V_6O_{13}$, $V_5O_9$, VO, $V_8O_{15}$, $NbO_2$, $Ti_2O_3$, $LaCoO_3$, $Ti_3O_5$, $SmNiO_3$, $NdNiO_3$, $PrNiO_3$, $Fe_3O_4$ or chalcogenides such as GeTe or GeSbTe.

According to a further embodiment, the phase shifting device is a plasma dispersion modulator. The plasma dispersion effect is related to the density of free carriers in a semiconductor, which changes both the real and imaginary parts of the refractive index. This may be described by the Drude-Lorenz equations that relate the concentration of electrons and holes to the absorption coefficient and refractive index.

According to a further embodiment, the phase shifting device comprises an optical cavity comprising a non-linear optical material. A gate waveguide is coupled to the optical cavity and configured to guide the second interference signal to the optical cavity. The gate waveguide is further configured to change the refractive index of the non-linear optical material in dependence on the optical power of the second interference signal.

The optical cavity is further configured to receive the optical reference signal, to induce a phase shift in the optical reference signal and to provide the phase-encoded optical output signal.

According to an embodiment, the optical cavity may be formed by a waveguide. Such an embodied optical cavity provides refractive index changes based on the optical power of the optical signal in the gate waveguide.

Another aspect of the invention relates to a method for emulating a neuron functionality. The method comprises steps of providing an integrated optical circuit and processing, by the integrated optical circuit, a phase-encoded optical input signal. The method comprises further steps of emulating, by the integrated optical circuit, a neuron functionality with respect to the phase-encoded optical input signal and providing, by the integrated optical circuit, a phase-encoded optical output signal.

According to an embodiment, the method comprises further steps of converting the plurality of phase-encoded optical input signals into a plurality of amplitude-encoded signals, combining the plurality of amplitude-encoded signals into a summation signal and performing a non-linear conversion of the summation signal into the phase-encoded optical output signal.

According to another embodiment, the method comprises steps of carrying, by a reference waveguide, an optical reference signal and receiving, by a plurality of input waveguides, the plurality of phase-encoded optical input signals. The method comprises further steps of superimposing, by an optical interferometer system, the plurality of optical input signals and the optical reference signal into a plurality of first interference signals and superimposing, by the optical interferometer system, the plurality of first interference signals into a second interference signal. A further steps comprises providing, by a phase-shifting device, the phase-encoded optical output signal in dependence on the second interference signal.

Another aspect of the invention relates to a design structure tangibly embodied in a machine-readable medium for designing, manufacturing, or testing an integrated circuit. The design structure comprises an integrated optical circuit according to the first aspect.

Another aspect of the invention relates to an optical neural network comprising a plurality of integrated optical circuits according to the first aspect as neurons.

According to embodiments, the optical neural network comprises a plurality of further integrated optical circuits as synapse circuits.

According to an embodiment, the synapse circuits are configured to process a phase-encoded optical input signal and to provide a phase-encoded optical output signal. The phase-encoded optical output signal emulates a synapse functionality with respect to the phase-encoded optical input signal.

With such an embodied neural network the neuron as well as the synapse functionalities can be implemented in the optical domain.

According to an embodiment, the synapse circuit is configured to convert the phase-encoded optical input signal into an amplitude-encoded signal, to perform a weighting of the amplitude-encoded signal and to convert the weighted amplitude-encoded signal into the phase-encoded optical output signal.

According to such an embodiment, the synapse circuit operates in both the phase domain and the amplitude domain. While the input and the output operates in the phase domain, some intermediate processing is performed in the amplitude domain. This facilitates circuit implementations in the amplitude domain.

According to another embodiment, the synapse circuits comprise a reference waveguide configured to carry an optical reference signal, an input waveguide configured to receive the phase-encoded optical input signal, and an output waveguide. A phase difference between the optical reference signal and the optical input signal represents the phase of the phase encoded input signal. The optical integrated circuit further comprises an optical interferometer configured to convert the optical reference signal and the optical input signal into an interference signal by superimposition and a tunable attenuator configured to perform a weighting of the interference signal into a weighted interference signal. In addition, the integrated optical circuit comprises a phase-shifting device configured to convert the weighted interference signal into the phase-encoded optical output signal by inducing a phase shift in the optical reference signal in dependence on the weighted interference signal.

According to such an embodiment, the relative phase difference between the reference signal and the phase-encoded optical input signals defines an input state. The reference signal is fed in parallel to the interferometer and to the phase shifting device. The interferometer converts the reference signal and the phase-encoded input signal into an interference signal having an amplitude that depends on the phase shift between the reference signal and the phase-encoded input signal. More particularly, according to embodiments the phase of the phase encoded input signal can be mapped nonlinearly into an amplitude by the interferometer. The tunable attenuator sets the synaptic weight of the optical integrated circuit by performing an attenuation. The weight may be set e.g. in a training session of a neural network that comprises the integrated optical circuit. The phase of the phase encoded output signal is defined by the phase difference with respect to the reference signal.

Embodiments of the invention will be described in more detail below, by way of illustrative and non-limiting examples, with reference to the accompanying drawings.

DETAILED DESCRIPTION

Figure 1:
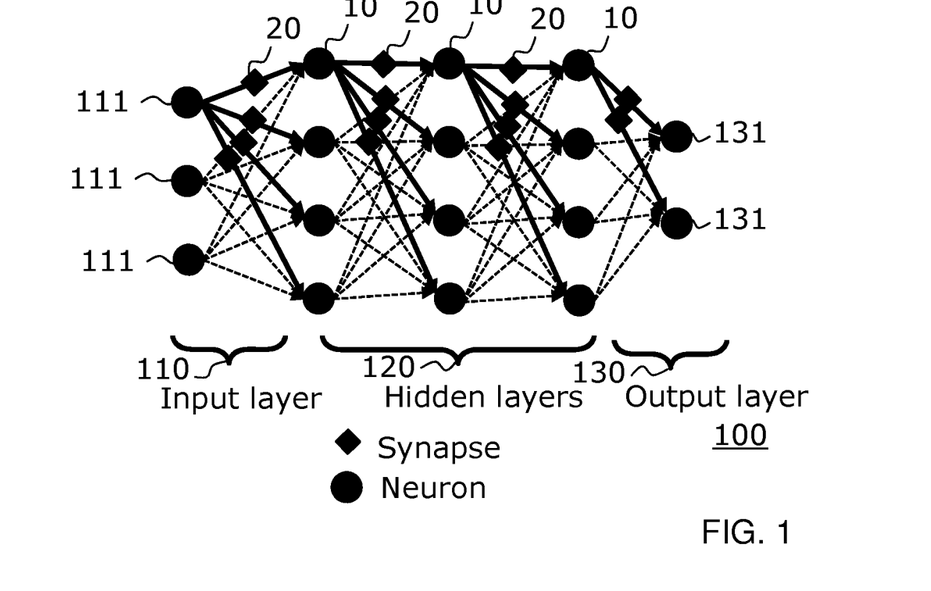
FIG. 1 shows an optical neural network according to an embodiment of the invention.

FIG. 1 shows an optical neural network 100 according to an embodiment of the invention. The optical neural network 100 comprises an input layer 110, a hidden layer 120 and an output layer 130. The input layer 110 comprises a plurality of input nodes 111, which are configured to receive phase encoded optical input signals and to provide the optical input signals to the hidden layer 120. The output layer 130 comprises a plurality of output nodes 131 which are configured to provide phase encoded optical output signals.

The hidden layer 120 comprises a plurality of integrated optical circuits. More particularly, the hidden layer 120 comprises integrated optical circuits 10 and integrated optical circuits 20. The integrated optical circuits 10 are embodied as neurons and may be in the following also denoted as neuron circuits 10. The integrated optical circuits 20 are embodied as synapses and may be in the following also denoted as synapse circuits 20.

The integrated optical circuits 10 are configured to process a plurality of phase-encoded optical input signals and to provide a phase-encoded optical output signal. The phase-encoded optical output signal emulates a neuron functionality with respect to the plurality of phase-encoded optical input signals.

The integrated optical circuits 20 are configured to process a phase-encoded optical input signal and to provide a phase-encoded optical output signal. The phase-encoded optical output signal emulates a synapse functionality with respect to the phase-encoded optical input signal.

Accordingly, the optical neural network 100 operates in the phase domain.

This offers advantages in terms of signal restoration. In particular, the phase is decoupled from propagation losses and remains constant. Furthermore, a reduced amplitude of optical mode decays due to propagation losses can be amplified again to restore the signal.

According to embodiments, weights of the synapse circuits 20 of the optical neural network 100 may be trained with a training process. The adjustment of the weights of the optical synapse circuits 20 may be done in software or hardware according to embodiments.

Figure 2:
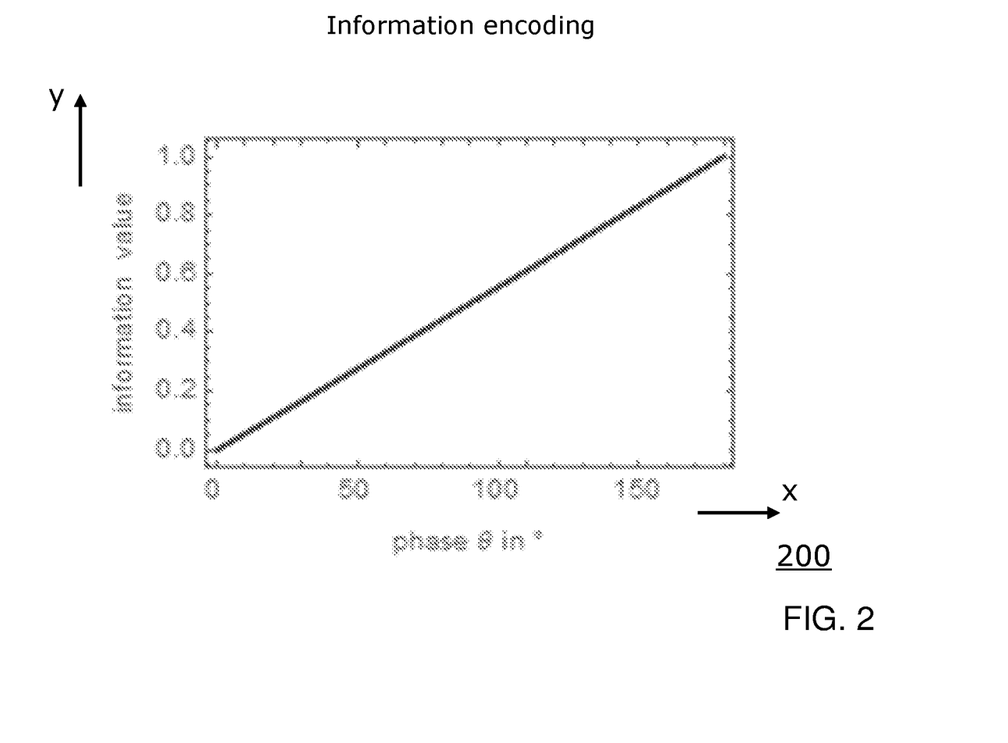
FIG. 2 shows a schematic diagram of an information encoding scheme according to an embodiment of the invention.

FIG. 2 shows a schematic diagram (200) of an information encoding scheme according to an embodiment of the invention. The x-axis denotes the phase of the phase-encoded optical input signals and the phase of the phase-encoded optical output signals of the neuron circuits 10 and of the synapse circuits 20. The y-axis denotes a corresponding information value. The phase of the phase-encoded optical input and output signals operates in a predefined range between 0° and 180° and the corresponding information value is in a range between 0 and 1.

Figure 3:
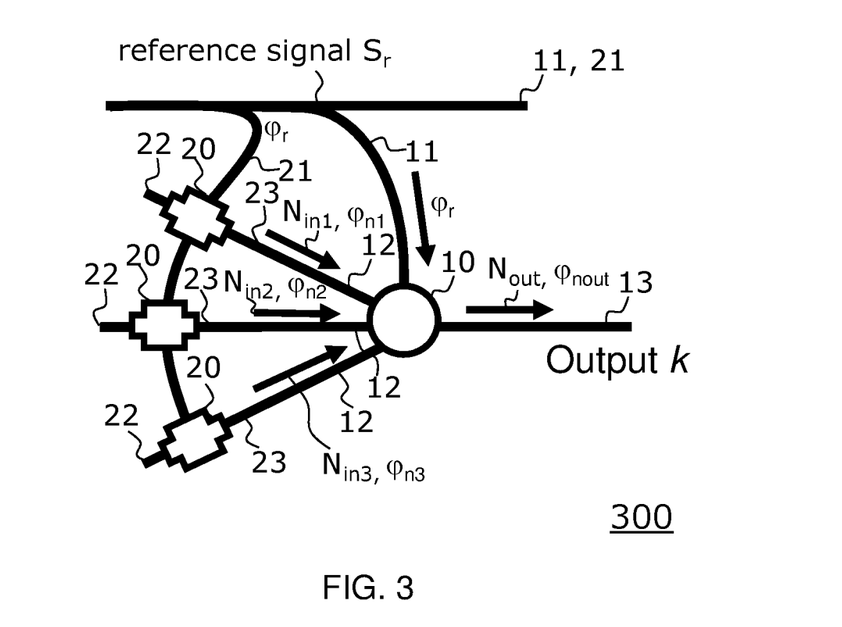
FIG. 3 shows an enlarged view of a section of an optical neural network according to an embodiment of the invention.

FIG. 3 shows schematically an enlarged view 300 of a section of an optical neural network according to an embodiment of the invention, e.g. of the optical neural network 100.

The enlarged view 300 shows 3 synapse circuits 20 and a neuron circuit 10. The neuron circuit 10 comprises or is coupled to a reference waveguide 11. The reference waveguide 11 is configured to carry an optical reference signal $S_r$ providing a reference phase $\varphi_r$. The neuron circuit 10 further comprises a plurality of input waveguides 12 configured to receive a plurality of phase-encoded optical input signals, in this example the neuron input signals $N_{in1}$, $N_{in2}$ and $N_{in3}$. The phase difference between the optical reference signal $S_r$ and the neuron input signals $N_{in1}$, $N_{in2}$ and $N_{in3}$ represent the respective phase of the phase encoded optical input signals. More particularly, the neuron input signals $N_{in1}$, $N_{in2}$ and $N_{in3}$ have a phase $\varphi_{n1}$, $\varphi_{n2}$ and $\varphi_{n3}$ respectively with respect to the phase $\varphi_r$ of the reference signal $S_r$.

The neuron circuit 10 processes the neuron input signals $N_{in1}$, $N_{in2}$ and $N_{in3}$ and the reference signal $S_r$ and provides a phase encoded optical output signal (13) $N_{out}$ having a phase $\varphi_{nout}$ (13).

Figure 4:
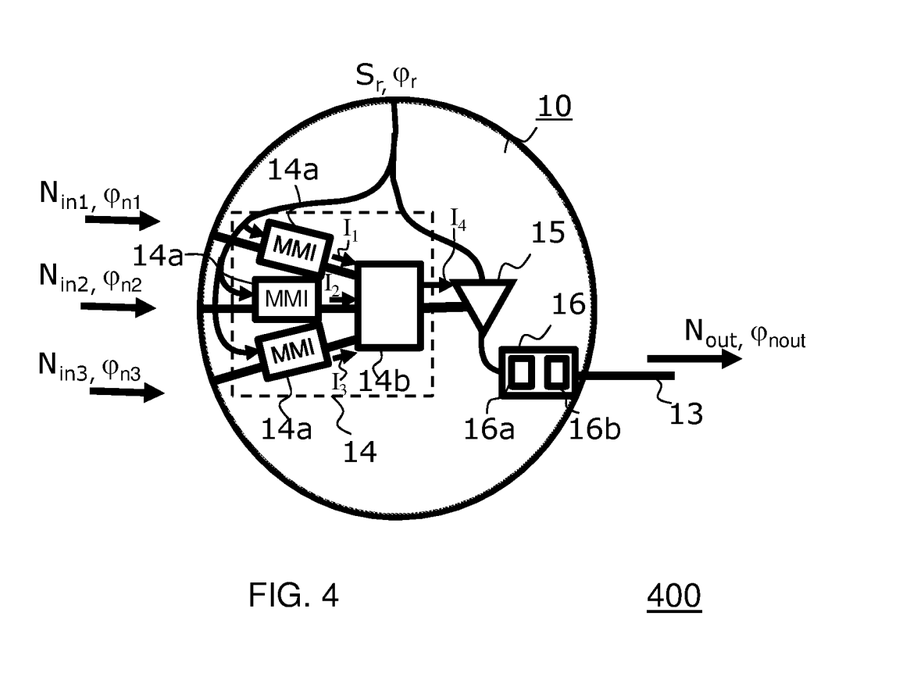
FIG. 4 shows an enlarged and more detailed view of the components of the neuron circuit according to an embodiment of the invention.

FIG. 4 shows an enlarged and more detailed view (400) of the components of the neuron circuit 10 according to an embodiment of the invention.

The neuron circuit 10 comprises an optical interferometer system 14. The optical interferometer system 14 comprises a plurality of first interferometers 14a. Each of the first interferometers 14a is configured to receive the optical reference signal $S_r$ and one of the plurality of optical input signals $N_{in1}$, $N_{in2}$ or $N_{in3}$ and to superimpose the optical reference signal $S_r$ and one of the respective optical input signals $N_{in1}$, $N_{in2}$ or $N_{in3}$ into a plurality of first interference signals $I_1$, $I_2$ and $I_3$ respectively. The plurality of first interference signals $I_1$, $I_2$ and $I_3$ form a plurality of amplitude-encoded signals. In other words, the respective amplitude of the first interference signals $I_1$, $I_2$ and $I_3$ represents the information of the first interference signals $I_1$, $I_2$ and $I_3$.

In addition, the optical interferometer system 14 comprises a device 14b for a further processing of the first interference signals $I_1$, $I_2$ and $I_3$. According to an embodiment, the device 14b may be implemented as second interferometer 14b. According to such an embodiment the second interferometer 14b is configured to receive the plurality of first interference signals $I_1$, $I_2$ and $I_3$ and to superimpose the plurality of first interference signals $I_1$, $I_2$ and $I_3$ into a second interference signal $I_4$. According to another embodiment, the device 14b may be implemented as amplitude-integration device, e.g. as a photodetector. According to such an embodiment, the amplitude-integration device 14b performs an integration/summation of the plurality of first interference signals, in this example of the first interference signals $I_1$, $I_2$ and $I_3$ and provides a summation signal $I_4$ that emulates a summation/integration of the plurality of first interference signals $I_1$, $I_2$ and $I_3$.

The neuron circuit 10 further comprises a phase-shifting device 15 configured to provide a phase-encoded optical output signal $N_{out}$ in dependence on the second interference signal $I_4$. According to embodiments, the phase shifting device 15 performs a non-linear conversion of the second interference signal $I_4$ into the phase-encoded optical output signal $N_{out}$.

The phase shifting device 15 may comprise a non-linear material providing a non-linear power-to-refractive-index conversion. According to embodiments, the nonlinear material may be in particular $BaTiO_3$. According to yet other embodiments, the phase shifting device 15 may comprise a phase change material such as $VO_2$ or chalcogenide-based materials. According to yet other embodiments, the phase shifting device 15 may be embodied as a plasma dispersion modulator.

The neuron circuit 10 further comprises a power normalization unit 16 configured to perform a normalization of the output power of the phase-encoded optical output signal (13) $N_{out}$.

According to embodiments, the power normalization unit 16 comprises an amplifier 16a and a saturated absorber 16b.

Figure 5:
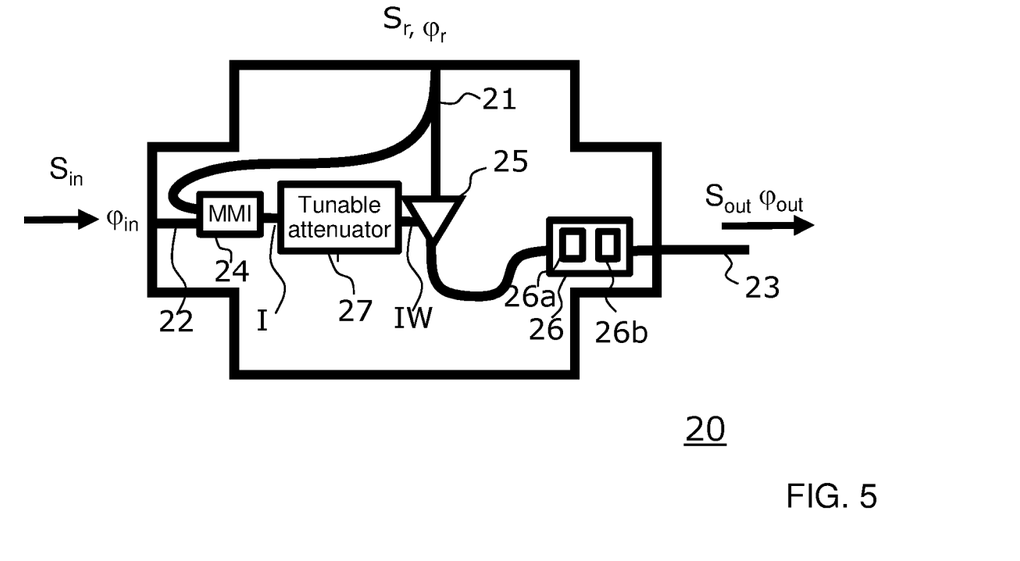
FIG. 5 shows an enlarged and more detailed view of the components of a synapse circuit according to an embodiment of the invention.

FIG. 5 shows an enlarged and more detailed view of the components of a synapse circuit 20 according to an embodiment of the invention.

The synapse circuit 20 comprises a reference waveguide 21 configured to carry an optical reference signal $S_r$ and an input waveguide 22 configured to receive a phase-encoded optical input signal $S_{in}$. A phase difference $\varphi_{in}$ between the phase $\varphi_r$ of the optical reference signal and the phase of the optical input signal represents the phase $\varphi_{in}$ of the phase encoded optical input signal $S_{in}$. In addition, the synapse circuit 20 comprises an output waveguide 23 and an optical interferometer 24. The optical interferometer 24 is configured to convert the optical reference signal $S_r$ and the optical input signal $S_{in}$ into an interference signal I by superimposition. The interference signal I forms an amplitude-encoded signal. In other words, the amplitude of the interference signal I carries the information. Furthermore, the synapse circuit 20 comprises a tunable attenuator 27 configured to perform a weighting of the interference signal I into a weighted interference signal IW. The weighted interference signal IW may also be denoted as weighted amplitude-encoded signal. A phase-shifting device 25 is configured to convert the weighted interference signal IW into a phase-encoded optical output signal $S_{out}$. More particularly, the phase-shifting device 25 induces a phase shift in the optical reference signal $S_r$ in dependence on the weighted interference signal IW. The induced phase shift may have a linear or a non-linear dependence on the weighted interference signal IW.

The synapse circuit 20 further comprises a power normalization unit 26 configured to perform a normalization of the output power of the phase-encoded optical output signal $S_{out}$.

The power normalization unit 26 comprises an amplifier 26a and a saturated absorber 26b.

The phase shifting device 25 may comprise a non-linear material providing a non-linear power-to-refractive-index conversion. According to embodiments, the nonlinear material may be in particular $BaTiO_3$. According to yet other embodiments, the phase shifting device 25 may comprise a phase change material such as $VO_2$ or chalcogenide-based materials. According to yet other embodiments, the phase shifting device 25 may be embodied as a plasma dispersion modulator.

Figure 6:
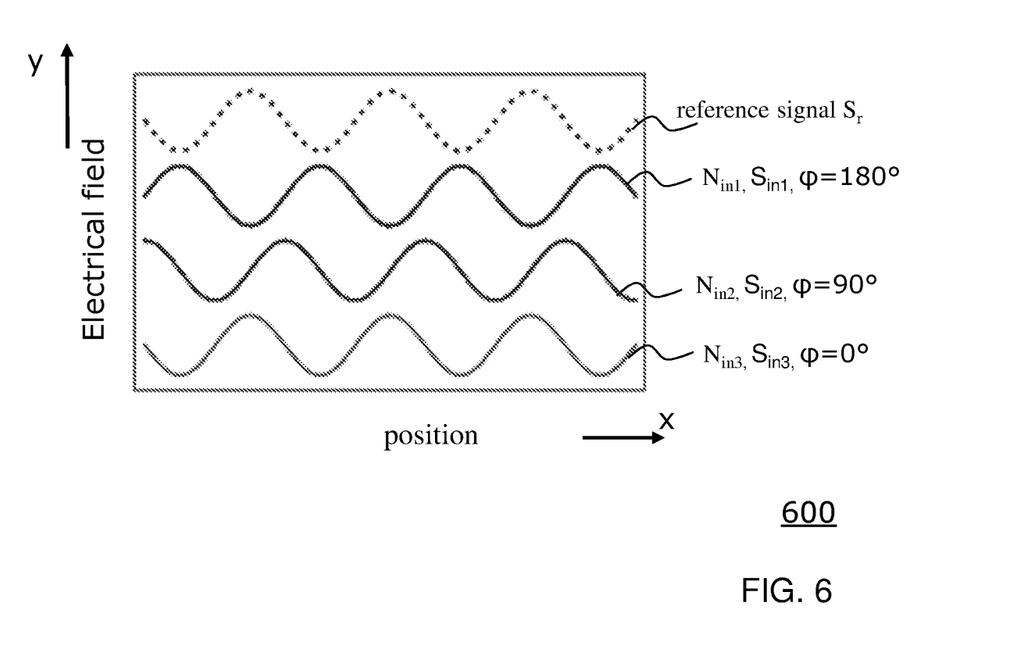
FIG. 6 illustrates schematically an example of a plurality of optical input signals as well as a corresponding reference signal.

FIG. 6 illustrates schematically an example (600) of a plurality of optical input signals as well as a corresponding reference signal. More particularly, FIG. 6 shows optical input signals $N_{in1}$, $N_{in2}$ and Nina of the neuron circuit 10 as illustrated in FIG. 4 and optical input signals $S_{in1}$, $S_{in2}$ and $S_{in3}$ of the synapse circuit 20 as illustrated in FIG. 5. In addition, a corresponding reference signal $S_r$ is shown and illustrated with a dotted line.

The input signals $N_{in3}$, $S_{in3}$ are in phase with the reference signal $S_r$, corresponding to an input phase $\varphi=0°$. The input signals $N_{in2}$, $S_{in2}$ have a 90 degree phase shift with respect to the reference signal $S_r$ and hence an input phase $\varphi=90°$.

The input signals $N_{in1}$, $S_{in1}$ have a 180° degree phase shift with respect to the reference signal $S_r$ and hence an input phase φ=180°.

Figure 7:
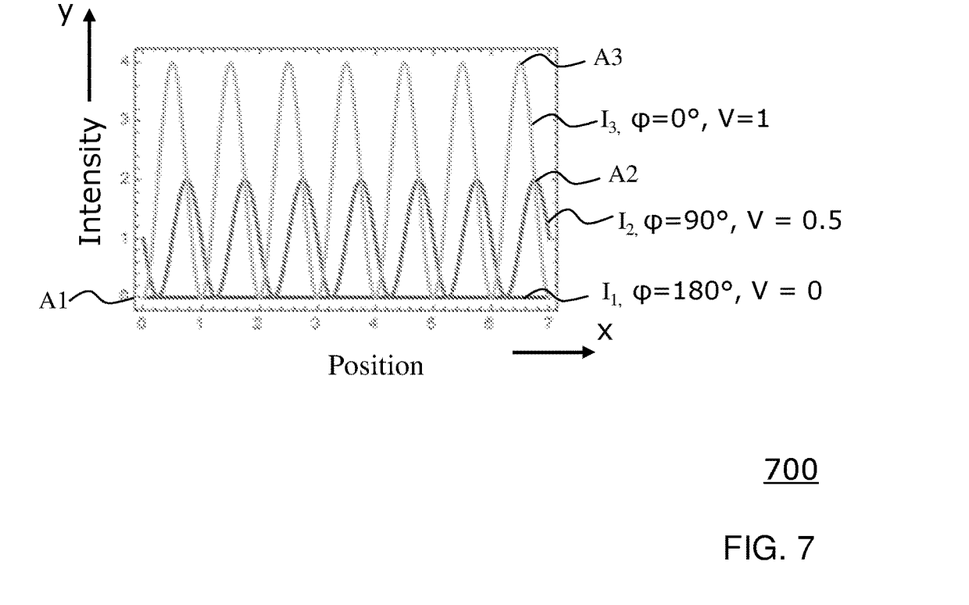
FIG. 7 illustrates schematically the superimposition of the plurality of optical input signals with the reference signal.

FIG. 7 illustrates schematically (700) the superimposition of the plurality of optical input signals $N_{in1}$, $N_{in2}$ and $N_{in3}$ and $S_{in1}$, $S_{in2}$ and $S_{in3}$ respectively with the reference signal $S_r$.

This results in a set of interference signals, namely in this example in the set comprising the interference signals $I_1$, $I_2$ and $I_3$.

The interference signal $I_3$ of the input signals $N_{in3}$, $S_{in3}$ and the reference signal $S_r$ has the highest amplitude A3 as both superimposed signals are in-phase. The interference signal $I_2$ of the input signals $N_{in2}$, $S_{in2}$ and the reference signal $S_r$ has a medium amplitude A2. The interference signal $I_1$ of the input signals $N_{in1}$, $S_{in1}$ and the reference signal $S_r$ has a zero amplitude due to the opposite phase of the input signals $N_{in1}$, $S_{in1}$ and the reference signal $S_r$.

According to an embodiment, the phase difference of 180 degree may be mapped to an information value V="0", the phase difference of 90 degree to an information value V="0.5" and the phase difference of 0 degree to an information value of V="1".

According to another example, the phase difference of 180 degree may be mapped to an information value V="1", the phase difference of 90 degree to an information value V="0.5" and the phase difference of 0 degree to an information value V="0".

Figure 8:
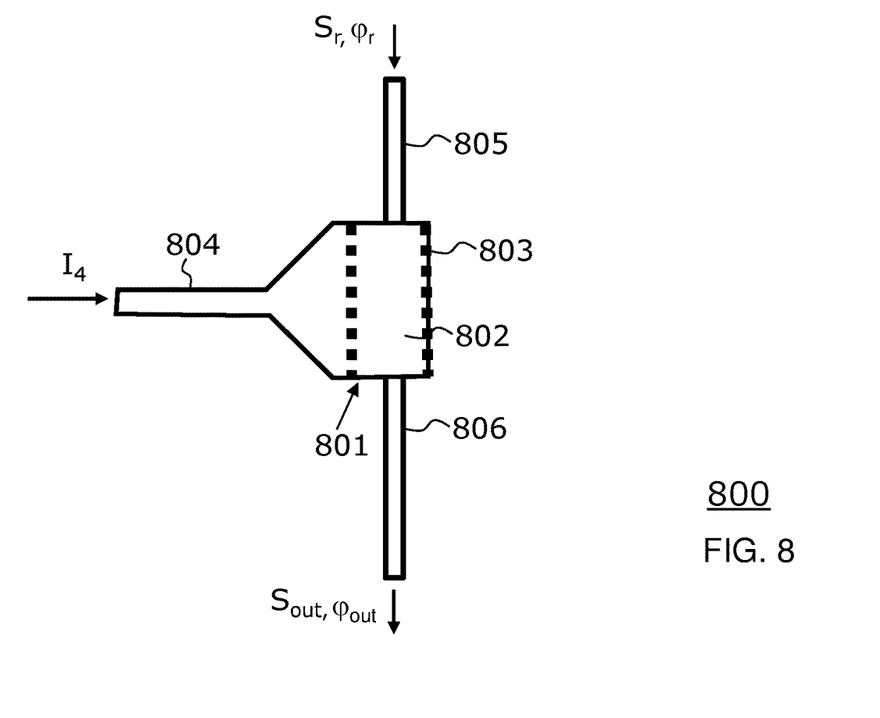
FIG. 8 shows an enlarged and more detailed view of an embodiment of a phase shifting device of a neuron circuit according to an embodiment of the invention.

FIG. 8 shows an enlarged and more detailed view (800) of an embodiment of a phase shifting device 15 of the neuron circuit 10 according to an embodiment of the invention.

The phase shifting device 15 comprises according to this embodiment an optical cavity 801 comprising a non-linear optical material 802. The optical cavity 801 is formed by a plurality of reflectors 803. Furthermore, a gate waveguide 804 is provided and coupled to the optical cavity 801. The phase shifting device 15 is configured to guide the second interference signal $I_4$ of the output of the second interferometer 14b via the gate waveguide 804 to the optical cavity 801. The phase shifting device 15 is further configured to change the refractive index of the non-linear material 802 in dependence on the optical power of the second interference signal I4. More particularly, the optical cavity 801 is configured to receive the optical reference signal $S_r$ via a waveguide 805 and to induce a phase shift in the optical reference signal $S_r$. As a result, the phase shifting device 15 provides the phase-encoded optical output signal $S_{out}$ having a phase $φ_{out}$ at an output waveguide 806.

Figure 9:
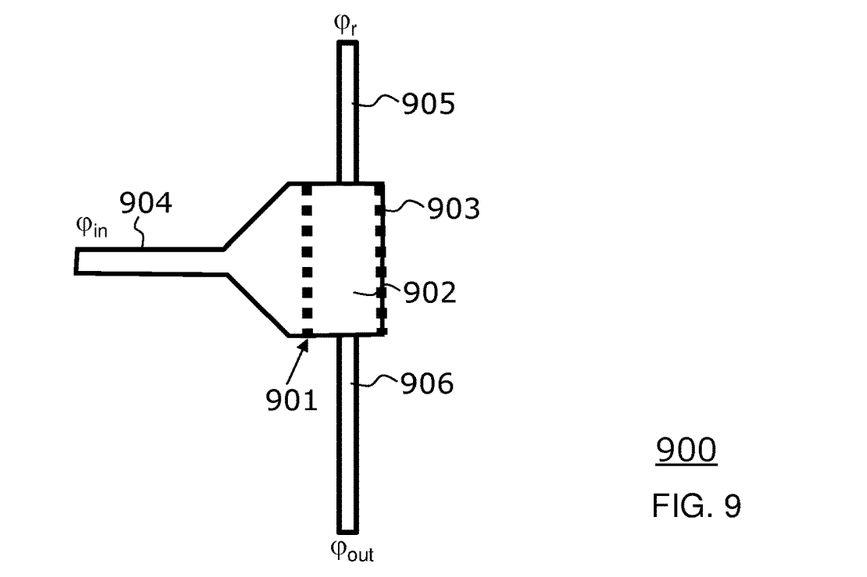
FIG. 9 shows an enlarged and more detailed view of an embodiment of a phase shifting device of a synapse circuit according to an embodiment of the invention.

FIG. 9 shows an enlarged and more detailed view (900) of an embodiment of a phase shifting device 25 of the synapse circuit 20 according to an embodiment of the invention.

The phase shifting device 25 comprises an optical cavity 901 comprising a non-linear optical material 902. The optical cavity 901 is formed by a plurality of reflectors 903. Furthermore, a gate waveguide 904 is provided and coupled to the optical cavity 901. The phase shifting device 25 is configured to guide the weighted interference signal IW from the tunable attenuator 27 (see FIG. 5) via the gate waveguide 904 to the optical cavity 901. The phase shifting device 25 is further configured to change the refractive index of the non-linear material 902 in dependence on the optical power of the weighted interference signal IW. More particularly, the optical cavity 901 is configured to receive the weighted interference signal IW and to induce a phase shift in the optical reference signal $S_r$ (e.g., received via a waveguide 905). As a result, the phase shifting device 25 provides the phase-encoded optical output signal $S_{out}$ having a phase (pout at an output waveguide 906.

Figure 10:
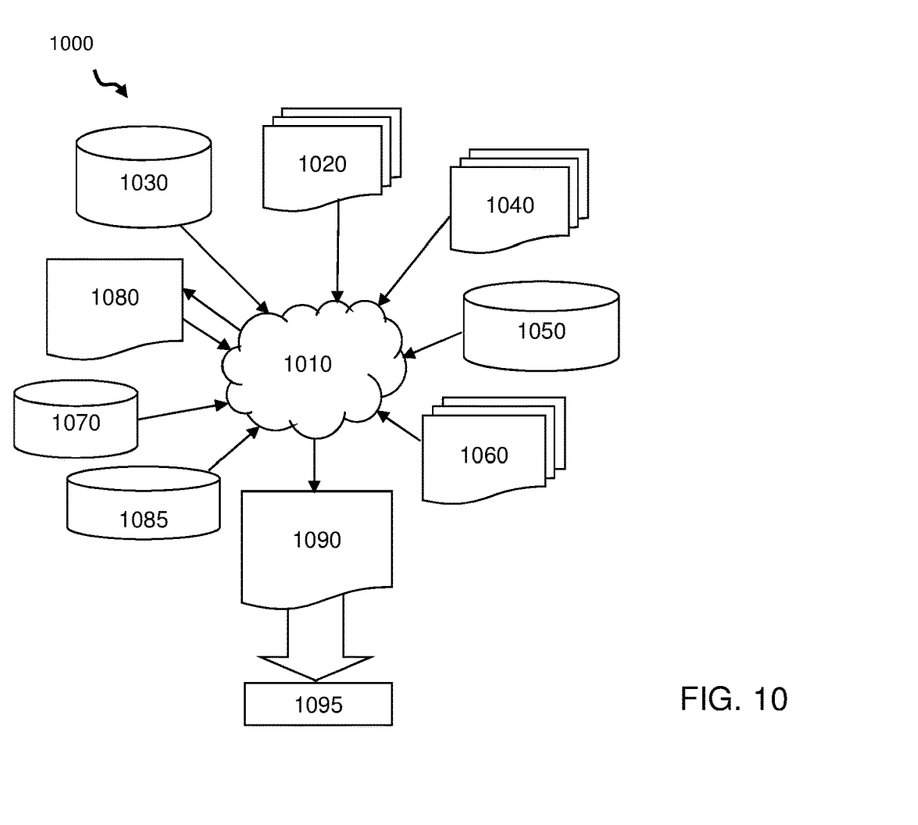
FIG. 10 shows a block diagram of an exemplary design flow used for example, in semiconductor IC logic design, simulation, test, layout, and manufacture.

FIG. 10 shows a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown e.g. in FIGS. 3 to 5. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown in FIGS. 3 to 5. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1010 preferably employs and incorporates hardware and/or software modules for synthesizing, translating, or otherwise processing a design/simulation functional equivalent of the components, circuits, devices, or logic structures shown in FIGS. 1-8 to generate a Netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1010 may include hardware and software modules for processing a variety of input data structure types including Netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 3 to 5. In one embodiment, design structure 1090 may comprise a compiled, executable HDL simulation model that functionally simulates the devices shown in FIGS. 3 to 5.

Design structure 1090 may also employ a data format used for the exchange of layout data of integrated circuits and/or symbolic data format (e.g. information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1 to 8. Design structure 1090 may then proceed to a stage 1095 where, for example, design structure 1090: proceeds to tape-out, is released to manufacturing, is released to a mask house, is sent to another design house, is sent back to the customer, etc.

Figure 11:
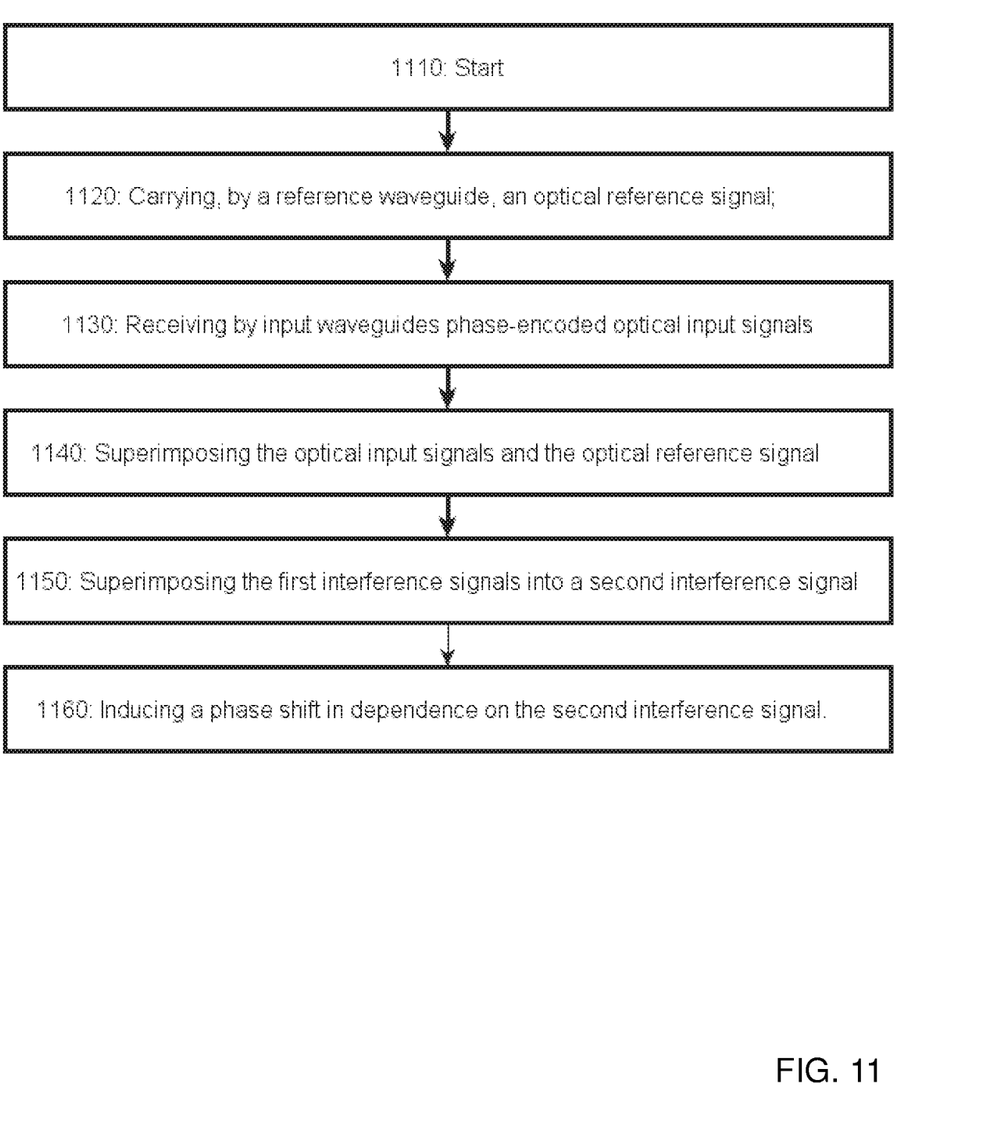
FIG. 11 shows method steps of a method for emulating a neuron functionality.

FIG. 11 shows method steps of a method for emulating a neuron functionality. The method provides an integrated optical circuit. The integrated optical circuit processes a phase-encoded optical input signal, emulates a neuron functionality with respect to the phase-encoded optical input signal and provides a phase-encoded output signal.

More particularly, the method starts at a step 1110.

At a step 1120, a reference waveguide carries an optical reference signal.

At a step 1130, a plurality of input waveguides receive a plurality of phase-encoded optical input signals.

At a step 1140, an optical interferometer system superimposes the plurality of optical input signals and the optical reference signal into a plurality of first interference signals.

At a step 1150, the optical interferometer system superimposes the plurality of first interference signals into a second interference signal.

And at a step 1160, a phase-shifting device provides a phase-encoded optical output signal in dependence on the second interference signal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An integrated optical circuit for an optical neural network, the optical circuit being configured:
    to process a plurality of phase-encoded optical input signals; and
    to provide a phase-encoded optical output signal as a function of the phase-encoded optical input signals, the phase-encoded optical output signal emulating a neuron functionality with respect to the plurality of phase-encoded optical input signals;
    the integrated optical circuit comprising:
    a reference waveguide configured to carry an optical reference signal;
    a plurality of input waveguides configured to receive the plurality of phase-encoded optical input signals, wherein phase differences between the optical reference signal and the optical input signals represent the respective phase of the respective phase-encoded optical input signal;
an output waveguide;
an optical interferometer system configured:
to superimpose the plurality of optical input signals and the optical reference signal into a plurality of first interference signals; and
to superimpose the plurality of first interference signals into a second interference signal; and
a phase-shifting device configured to provide the phase-encoded optical output signal as a function of the second interference signal.

2. The integrated optical circuit according to claim 1, wherein the integrated optical circuit is configured:
to convert the plurality of phase-encoded optical input signals into a plurality of amplitude-encoded signals;
to combine the plurality of amplitude-encoded signals into a summation signal; and
to perform a non-linear conversion of the summation signal into the phase-encoded optical output signal.

3. The integrated optical circuit according to claim 1, further comprising:
a plurality of first interferometers, each of the first interferometers being configured:
to receive the optical reference signal and one of the plurality of optical input signals; and
to superimpose the optical reference signal and the optical input signals into the plurality of first interference signals; and
a second interferometer configured to receive the plurality of first interference signals and to superimpose the plurality of first interference signals into the second interference signal.

4. The integrated optical circuit according to claim 1, wherein the optical interferometer system comprises at least one of one or more multi-mode interferometers and one or more single-mode interferometers.

5. The integrated optical circuit according to claim 1, wherein the phase-encoded optical output signal comprises a phase shift within a predefined range relative to the optical reference signal.

6. The integrated optical circuit according to claim 1, further comprising a power normalization unit configured to perform a normalization of an output power of the phase-encoded optical output signal.

7. The integrated optical circuit according to claim 1, wherein the phase-shifting device comprises a non-linear material providing a non-linear power-to-refractive-index conversion.

8. The integrated optical circuit according to claim 1, wherein the phase-shifting device comprises a phase change material.

9. The integrated optical circuit according to claim 1, wherein the phase-shifting device comprises a plasma dispersion modulator.

10. The integrated optical circuit according to claim 1, wherein the phase-shifting device comprises:
an optical cavity comprising a non-linear material; and
a gate waveguide coupled to the optical cavity and configured to guide the second interference signal to the optical cavity and to change the refractive index of the non-linear material as a function of the optical power of the second interference signal;
wherein the optical cavity is configured:
to receive the optical reference signal;
to induce a phase shift in the optical reference signal; and
to provide the phase-encoded optical output signal.

11. The integrated optical circuit according to claim 5, wherein the predefined range is a range between 0° and 180°.

12. The integrated optical circuit according to claim 6, wherein the power normalization unit comprises an amplifier and a saturated absorber.

13. The integrated optical circuit according to claim 7, wherein the nonlinear material is selected from the group consisting of: $BaTiO_3$, $LiNbO_3$, ferroelectric perovskites, polymers with non-linear optical properties, chalcogenides and III-V compound semiconductors.

14. The integrated optical circuit according to claim 8, wherein the phase change material is selected from the group consisting of: $VO_2$, $V_4O_7$, $V_6O_{11}$, $V_2O_3$, $V_6O_{13}$, $V_5O_9$, $VO$, $V_8O_{15}$, $NbO_2$, $Ti_2O_3$, $LaCoO_3$, $Ti_3O_5$, $SmNiO_3$, $NdNiO_3$, $PrNiO_3$, $Fe_3O_4$ and chalcogenides.

15. A method for emulating a neuron functionality, the method comprising:
providing an integrated optical circuit;
processing, by the integrated optical circuit, a phase-encoded optical input signal;
emulating, by the integrated optical circuit, a neuron functionality with respect to the phase-encoded optical input signal; and
providing, by the integrated optical circuit, a phase-encoded optical output signal carrying, by a reference waveguide, an optical reference signal;
receiving, by a plurality of input waveguides, the plurality of phase-encoded optical input signals, wherein phase differences between the optical reference signal and the optical input signals represent the respective phase of the respective phase encoded input signal;
superimposing, by an optical interferometer system, the plurality of optical input signals and the optical reference signal into a plurality of first interference signals;
superimposing, by the optical interferometer system, the plurality of first interference signals into a second interference signal; and
providing, by a phase-shifting device, the phase-encoded optical output signal as a function of the second interference signal.

16. The method according to claim 15, further comprising:
converting the plurality of phase-encoded optical input signals into a plurality of amplitude-encoded signals;
combining the plurality of amplitude-encoded signals into a summation signal; and
performing a non-linear conversion of the summation signal into the phase-encoded optical output signal.

17. An optical neural network, comprising:
a plurality of integrated optical circuits as neurons, each of at least a subset of the integrated optical circuits being configured:
to process a plurality of phase-encoded optical input signals; and
to provide a phase-encoded optical output signal as a function of the phase-encoded optical input signals, the phase-encoded optical output signal emulating a neuron functionality with respect to the plurality of phase-encoded optical input signals;

a plurality of further integrated optical circuits as synapse circuits, the synapse circuits being configured:
  to process a phase-encoded optical input signal; and
  to provide a phase-encoded output signal, the phase-encoded optical output signal emulating a synapse functionality with respect to the phase-encoded optical input signal;
wherein the synapse circuits are configured:
  to convert the phase-encoded optical input signal into an amplitude-encoded signal;
  to perform a weighting of the amplitude-encoded signal; and
  to convert the weighted amplitude-encoded signal into the phase-encoded optical output signal;
the synapse circuits comprising:
a reference waveguide configured to carry an optical reference signal;
an input waveguide configured to receive the phase-encoded optical input signal, wherein a phase difference between the optical reference signal and the optical input signal represents the phase of the phase-encoded input signal;
an output waveguide;
an optical interferometer configured to convert the optical reference signal and the optical input signal into an interference signal by superimposition;
a tunable attenuator configured to perform a weighting of the interference signal into a weighted interference signal; and
a phase-shifting device configured to convert the weighted interference signal into the phase-encoded optical output signal by inducing a phase shift in the optical reference signal as a function of the weighted interference signal.

18. An optical neural network, comprising:
a plurality of integrated optical circuits as neurons, each of at least a subset of the integrated optical circuits being configured:
  to process a plurality of phase-encoded optical input signals; and
  to provide a phase-encoded optical output signal as a function of the phase-encoded optical input signals, the phase-encoded optical output signal emulating a neuron functionality with respect to the plurality of phase-encoded optical input signals; and
a plurality of further integrated optical circuits as synapse circuits, the synapse circuits comprising:
  a reference waveguide configured to carry an optical reference signal;
  an input waveguide configured to receive a phase-encoded optical input signal, wherein a phase difference between the optical reference signal and the optical input signal represents a phase of the phase-encoded input signal;
  an output waveguide;
  an optical interferometer configured to convert the optical reference signal and the optical input signal into an interference signal by superimposition;
  a tunable attenuator configured to perform a weighting of the interference signal into a weighted interference signal; and
  a phase-shifting device configured to convert the weighted interference signal into the phase-encoded optical output signal by inducing a phase shift in the optical reference signal as a function of the weighted interference signal.

* * * * *